US012049995B1

(12) United States Patent
Furukawa

(10) Patent No.: US 12,049,995 B1
(45) Date of Patent: Jul. 30, 2024

(54) ILLUMINATOR FOR VEHICLE

(71) Applicant: SUBARU CORPORATION, Tokyo (JP)

(72) Inventor: Toshiya Furukawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/535,856

(22) Filed: Dec. 11, 2023

(30) Foreign Application Priority Data

Jan. 31, 2023 (JP) ................................ 2023-013191

(51) Int. Cl.
*F21S 41/64* (2018.01)
*F21S 41/25* (2018.01)
*F21S 41/30* (2018.01)
*F21S 41/40* (2018.01)
*F21S 45/60* (2018.01)

(52) U.S. Cl.
CPC ............... *F21S 45/60* (2018.01); *F21S 41/25* (2018.01); *F21S 41/30* (2018.01); *F21S 41/40* (2018.01)

(58) Field of Classification Search
CPC .. F21S 45/60; F21S 41/25; F21S 41/30; F21S 41/40; B60Q 2400/00; B60Q 2400/50; B60Q 2500/00; B60Q 2400/40; B60Q 2400/30; B60Q 2900/00; B60Q 11/00; B60Q 3/00; B60Q 2900/50
See application file for complete search history.

(56) References Cited

U.S. PATENT DOCUMENTS 10,955,107 B1 * 3/2021 Toyoshima ........... F21S 41/285
2021/0010651 A1 * 1/2021 Suetsugu .............. F21S 45/435
2021/0025559 A1 * 1/2021 Uchida ................... F21S 41/25

FOREIGN PATENT DOCUMENTS

JP 2019-133890 A 8/2019

* cited by examiner

*Primary Examiner* — Elmito Breval
(74) *Attorney, Agent, or Firm* — MCGINN I.P. LAW GROUP, PLLC

(57) ABSTRACT

An illuminator for a vehicle includes a light-source unit, a reflective member, a shade, a projection lens, and an outer-lens member. The outer-lens member includes a light-transmissive part and a slat. The slat has a flat plate shape whose thicknesswise direction coincides with a vehicle top-bottom direction of the vehicle and extending in a vehicle widthwise direction of the vehicle. The slat includes a slope inclining toward a vehicle lower side while extending toward the vehicle front side, a reflective layer disposed at a vehicle-upper-side surface of the slat, and a heat-absorbing layer disposed at the vehicle-lower-side surface of the slat.

4 Claims, 6 Drawing Sheets

ILLUMINATOR FOR VEHICLE

CROSS-REFERENCE TO RELATED APPLICATIONS

The present application claims priority from Japanese Patent Application No. 2023-013191 filed on Jan. 31, 2023, the entire contents of which are hereby incorporated by reference.

BACKGROUND

The disclosure relates to an illuminator for a vehicle.

In recent-year vehicles such as automobiles, light-emitting diodes (LEDs) are widely employed as light sources of headlights, aiming to achieve higher functions with lower power. However, comparing a known incandescent lamp and an LED that are of the same illuminance, the amount of heat generated by light emitted from the LED is smaller than that of the incandescent lamp. Therefore, when it is snowing, an LED that is used as a light source of an illuminator for a vehicle may be incapable of melting the snow fallen onto the emission surface of the illuminator. Consequently, the illuminance may be reduced.

In view of such a situation, a lamp unit is disclosed, for example, by Japanese Unexamined Patent Application Publication (JP-A) No. 2019-133890. The lamp unit is disposed in a lamp chamber and includes a reflector. Light emitted from an LED is reflected toward the front side of the lamp by the reflector. Furthermore, a light absorber that is capable of absorbing visible light is disposed between the front end of the reflector and a light-transmissive cover (an outer lens), and a condensing lens that condenses the light from the LED onto the light absorber is disposed at a position on the lamp front side relative to the LED. Such a configuration increases the ratio of the amount of light reaching the light absorber with respect to the total amount of light emitted from the LED. The light thus reached the light absorber is accumulated as heat in the light absorber. The heat is released in the lamp chamber and heats the outer lens from the inner surface of the outer lens.

SUMMARY

An aspect of the disclosure provides an illuminator for a vehicle. The illuminator includes a light-source unit, a reflective member, a shade, a projection lens, and an outer-lens member. The light-source unit is configured to emit illuminating light with a light-emitting diode serving as a light source. The reflective member is configured to generate reflected light by reflecting the illuminating light. The shade is configured to block a first beam of the illuminating light and a second beam of the reflected light. The projection lens is configured to cast the illuminating light and the reflected light toward a vehicle front side of the vehicle. The outer-lens member includes a light-transmissive part and a slat. The light-transmissive part is configured to transmit the illuminating light and the reflected light toward the vehicle front side. The slat has a flat plate shape whose thickness-wise direction coincides with a vehicle top-bottom direction of the vehicle and extends in a vehicle widthwise direction of the vehicle. The shade is disposed to reach such a height as to block the first beam of the illuminating light and the second beam of the reflected light and to allow a third beam of the illuminating light other than the first beam and a fourth beam of the reflected light other than the second beam to be cast onto a vehicle-lower-side surface of the slat. The first beam and the second beam are angled toward a vehicle upper front side. The slat includes a slope, a reflective layer, and a heat-absorbing layer. The slope inclines toward a vehicle lower side while extending toward the vehicle front side. The reflective layer is disposed at a vehicle-upper-side surface of the slat. The heat-absorbing layer is disposed at the vehicle-lower-side surface of the slat.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

In the technique disclosed by JP-A No. 2019-133890, light having reached the light absorber is accumulated as heat, and the heat is released in the lamp chamber to heat the outer lens from the inner surface of the outer lens. Therefore, the thermal diffusivity to the outer lens is low. Accordingly, it may take long to melt the snow or frost on the outer lens.

It is desirable to provide an illuminator for a vehicle configured to efficiently melt any snow fallen onto an outer lens thereof.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Referring to FIGS. 1 to 6, an illuminator 1 according to the embodiment that is applied to a vehicle V will now be described. The drawings have arrows as appropriate. Arrow FR points toward the front side of the vehicle V. Arrow UP points toward the upper side of the vehicle V in front view. Arrow LH points toward the left side of the vehicle V in front view. Directions to be expressed in the following description by using terms such as upper, lower, front, rear, left, and right refer to the respective directions in the front view of the vehicle V, unless otherwise stated.

Embodiment

Referring to FIGS. 1 to 4, a configuration of the illuminator 1 according to the present embodiment will first be described.

Configuration of Vehicle V

The vehicle V is an automobile including, for example, an internal combustion engine or a motor serving as a drive source. The vehicle V may alternatively be, for example, a hybrid vehicle including an internal combustion engine and a motor both serving as drive sources.

Configuration of Illuminator 1

Figure 1:
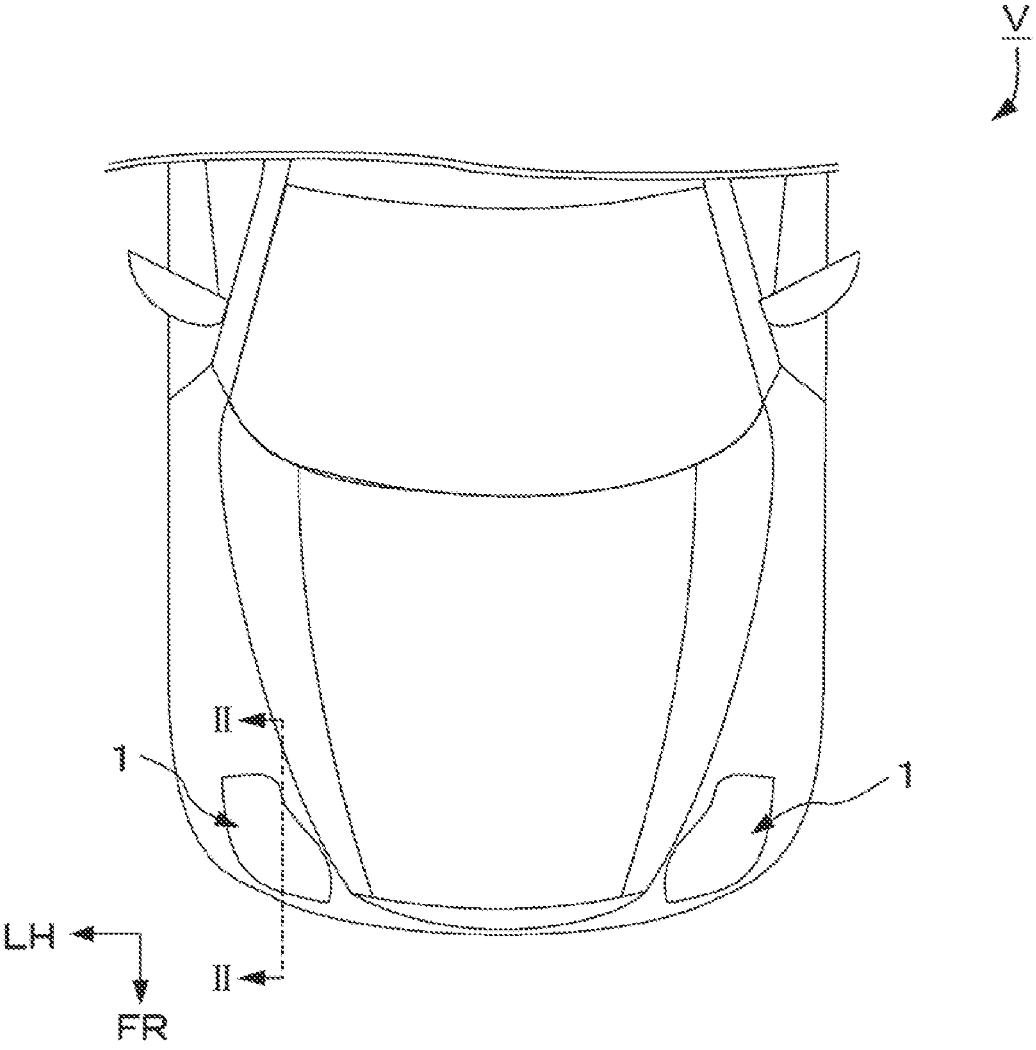
FIG. 1 outlines an illuminator for a vehicle according to an embodiment of the disclosure that is seen from above a vehicle V.

Referring to FIG. 1, the illuminator 1 is an illuminator disposed at a front part of the vehicle V and is configured to illuminate an area ahead of the vehicle V. Note that the illuminator 1 to be described below as one example is for low-beam use and is the one disposed on the left side of the vehicle V in front view.

Figure 2:
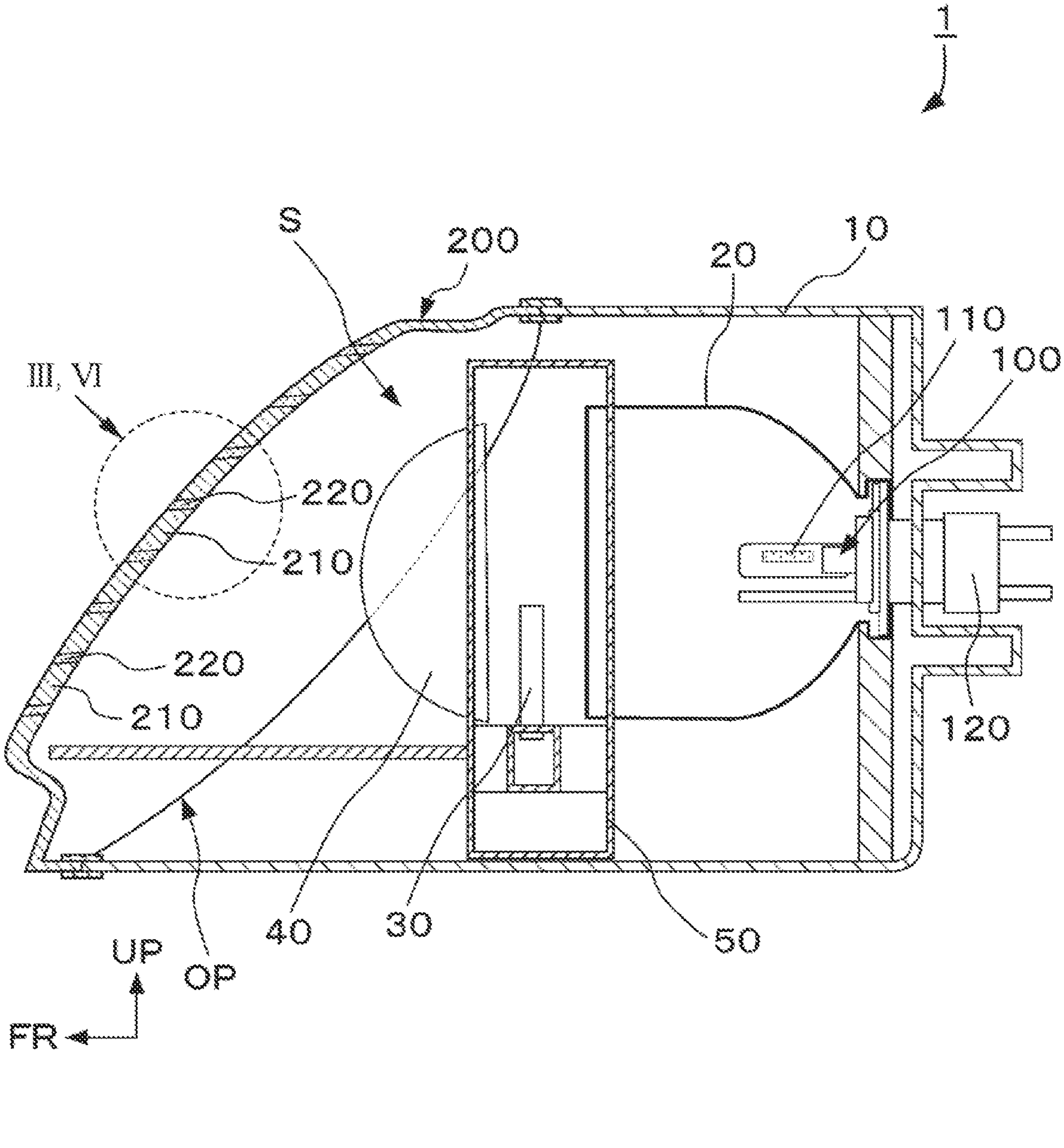
FIG. 2 illustrates a section of the illuminator illustrated in FIG. 1, taken along line II-II and seen in the direction of arrows II.

Referring to FIG. 2, the illuminator 1 includes a cover 10, a reflective member 20, a shade 30, a projection lens 40, a bracket 50, a light-source unit 100, and an outer-lens member 200. The cover 10 and the outer-lens member 200 are combined to form the outer shell of the illuminator 1. A space S is provided in the outer shell. The reflective member 20, the shade 30, the projection lens 40, the bracket 50, and the light-source unit 100 are disposed in the space S.

The cover 10 forms a rear part of the outer shell of the illuminator 1. The cover 10 is made of a material such as metal or high-temperature-resistant resin and has an opening OP at the front thereof. The outer-lens member 200, to be described below, is fitted at and covers the opening OP.

The cover 10 has ribs, bolt holes, and the like provided for fixing the elements disposed in the space S to the cover 10 and for fixing the illuminator 1 to the vehicle V. The illuminator 1 is fixed to the vehicle V with bolts and the like that are received by the bolt holes and the like provided in the cover 10.

The reflective member 20 is configured to generate reflected light RL by reflecting illuminating light DL, which is to be emitted from a light source 110. The reflective member 20 has a specular inner surface obtained through aluminum deposition or the like. The reflective member 20 is angled at multiple positions such that the reflected light RL travels frontward. The angles of the reflective member 20 at the respective positions are set such that the reflected light RL forms a focal point FC at a position above the shade 30 to be described below.

The illuminating light DL and the reflected light RL are emitted as front-illuminating light FL, which illuminates an area ahead of the vehicle J.

The shade 30 blocks some beams of the front-illuminating light FL, that is, the illuminating light DL and the reflected light RL. The shade 30 is disposed on the front side relative to the reflective member 20 but on the rear side relative to the projection lens 40. The shade 30 blocks glare and is disposed to reach such a height as to allow some beams of the front-illuminating light FL to be cast onto the lower surfaces of slats 220. The slats 220 are included in the outer-lens member 200 and will be described separately below. In one example, the shade 30 is disposed to reach such a height as to allow some beams of the front-illuminating light FL inclusive of glare to be cast onto the lower surfaces of the slats 220 but block some other beams of the front-illuminating light FL inclusive of glare that are angled toward an area above the highest one of the slats 220.

The projection lens 40 directs the front-illuminating light FL to travel frontward. In one example, the projection lens 40 directs the illuminating light DL, emitted from the light-source unit 100, and the reflected light RL, emitted from the light-source unit 100 and reflected by the reflective member 20, to travel frontward. The projection lens 40 is made of, for example, resin such as acrylic or polycarbonate or any other translucent material such as glass. The projection lens 40 is a convex lens that is convex frontward. For example, the projection lens 40 is an aspherical lens having an outwardly curved surface on the front side thereof and a substantially flat surface on the rear side thereof.

The reflective member 20, the shade 30, the projection lens 40, and the below-described light-source unit 100 that are disposed in the space S are fixed to the cover 10 with the aid of the bracket 50 in combination with the ribs and bolt holes provided in the cover 10. The bracket 50 is made of metal or resin.

Light-Source Unit 100

The light-source unit 100 is configured to emit illuminating light DL by using an LED serving as the light source 110. The light-source unit 100 includes the light source 110 and a light-source activator 120. The light source 110 is one or more light sources disposed at the tip of the light-source unit 100. The light source 110 is configured to emit illuminating light DL with the supply of electric power from the light-source activator 120.

In one example, the light source 110 may be based on an LED that emits white light. The light-source unit 100 may be based on any semiconductor light-emitting device such as an LED, a laser diode (LD), or an electroluminescent (EL) device, or any other device.

The light-source activator 120 is configured to supply electric power for activating the light source 110 to the light source 110. The light-source activator 120 includes at the rear thereof a heat sink (not illustrated) configured to radiate heat generated with the activation of the light source 110.

Outer-Lens Member 200

The outer-lens member 200 includes light-transmissive parts 210 and the slats 220. The light-transmissive parts 210 transmit the front-illuminating light FL toward the front side. The slats 220 each have a flat plate shape whose thicknesswise direction coincides with the top-bottom direction of the vehicle V and each extend in the widthwise direction of the vehicle V. The light-transmissive parts 210 and the slats 220 are laminated alternately in the top-bottom direction. The outer-lens member 200 is made of a translucent resin material such as polycarbonate. The outer-lens member 200 is fitted to a front part of the cover 10 in such a manner as to cover the opening OP and is fastened to the cover 10 with bolts or the like.

Figure 3:
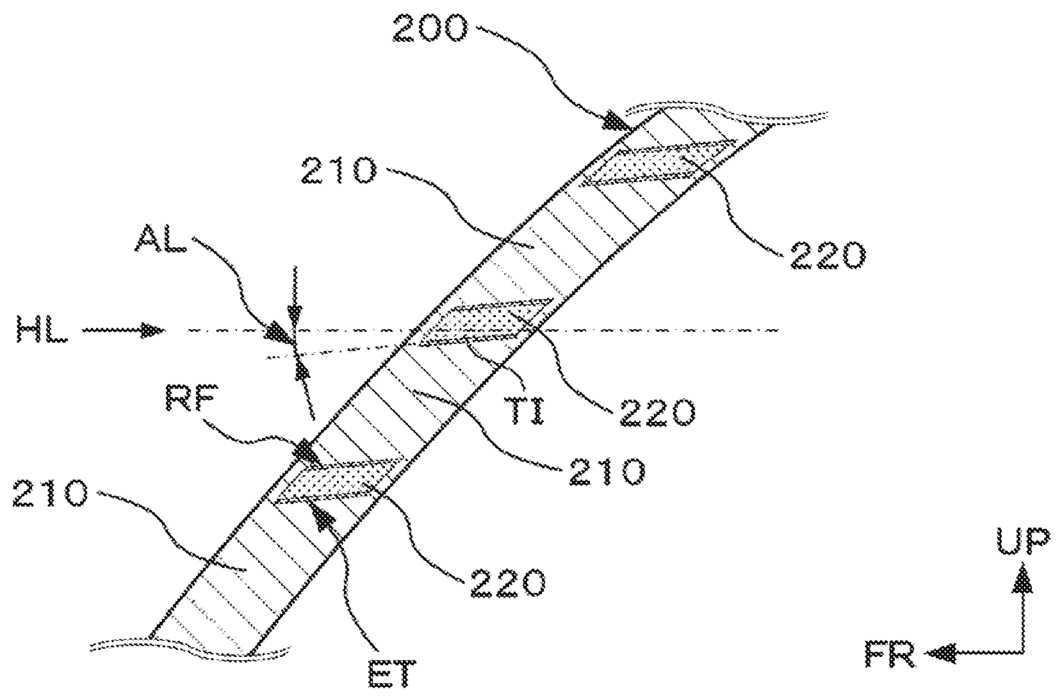
FIG. 3 illustrates an enlarged side view of a part, denoted by III, VI, of the section illustrated in FIG. 2.
Figure 4:
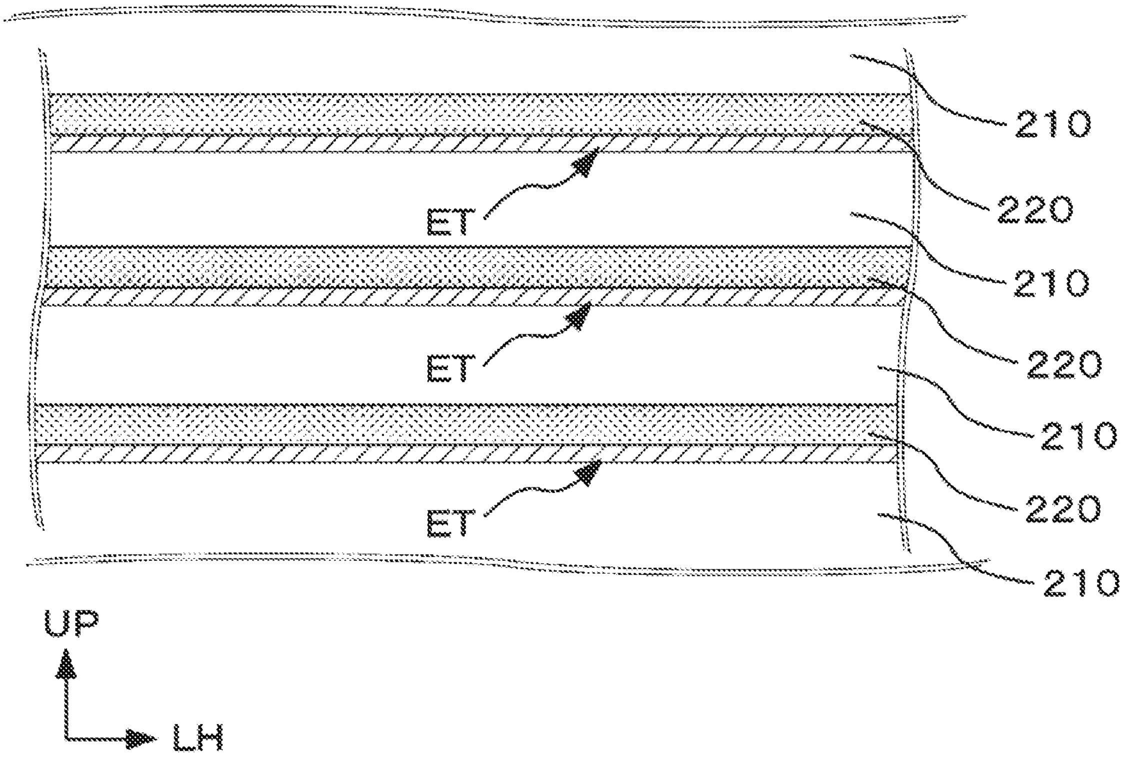
FIG. 4 illustrates an outer-lens member, illustrated in FIG. 3, seen from the vehicle rear side.

Referring to FIG. 3, the slats 220 are disposed in the resin material forming the outer-lens member 200 such that each light-transmissive part 210 is held between corresponding ones of the slats 220 in the top-bottom direction. That is, the light-transmissive parts 210 and the slats 220 are laminated alternately in the top-bottom direction.

The light-transmissive parts 210 are made of a translucent resin material such as polycarbonate and transmit the front-illuminating light FL toward the front side. The size of each light-transmissive part 210 in the top-bottom direction is greater than the size of each slat 220 in the top-bottom direction. The light-transmissive parts 210 may be obtained as portions of the resin material forming the outer-lens member 200 where the slats 220 are absent.

Each slat 220 has a slope TI, which inclines downward while extending frontward. The slat 220 has a reflective layer at the upper surface thereof, and a heat-absorbing layer at the lower surface thereof.

In one example, the slat 220 is made of a translucent resin material such as polycarbonate and has a flat plate shape whose thicknesswise direction coincides with the top-bottom direction of the vehicle V. The slat 220 having such a flat plate shape includes at the upper surface thereof a reflective layer RF, which reflects the front-illuminating light FL. The slat 220 further includes at the lower surface thereof a heat-absorbing layer ET, which absorbs heat from the front-illuminating light FL. The reflective layer RF and the heat-absorbing layer ET are each in close contact with a corresponding one of the light-transmissive parts 210 in the top-bottom direction. The slat 220 is in close contact with the resin material forming the outer-lens member 200 in the front-rear direction.

The reflective layer RF is obtained by, for example, performing aluminum deposition on the upper surface of the slat 220. The heat-absorbing layer ET is obtained by, for example, forming a black anodized aluminum layer or applying black coating. It is known that black anodized aluminum or black coating efficiently absorbs infrared light, which is contained in the front-illuminating light FL and in radiant heat generated from any heat source, and also efficiently converts the absorbed infrared light and radiant heat into heat.

The slope TI of the slat 220 is inclined downward while extending frontward, forming an angle AL with respect to a horizontal line HL. Referring to the rear view illustrated in FIG. 4, the angle AL of the slope TI is set such that the front-illuminating light FL is to be received by the heat-absorbing layer ET.

Workings

Figure 5:
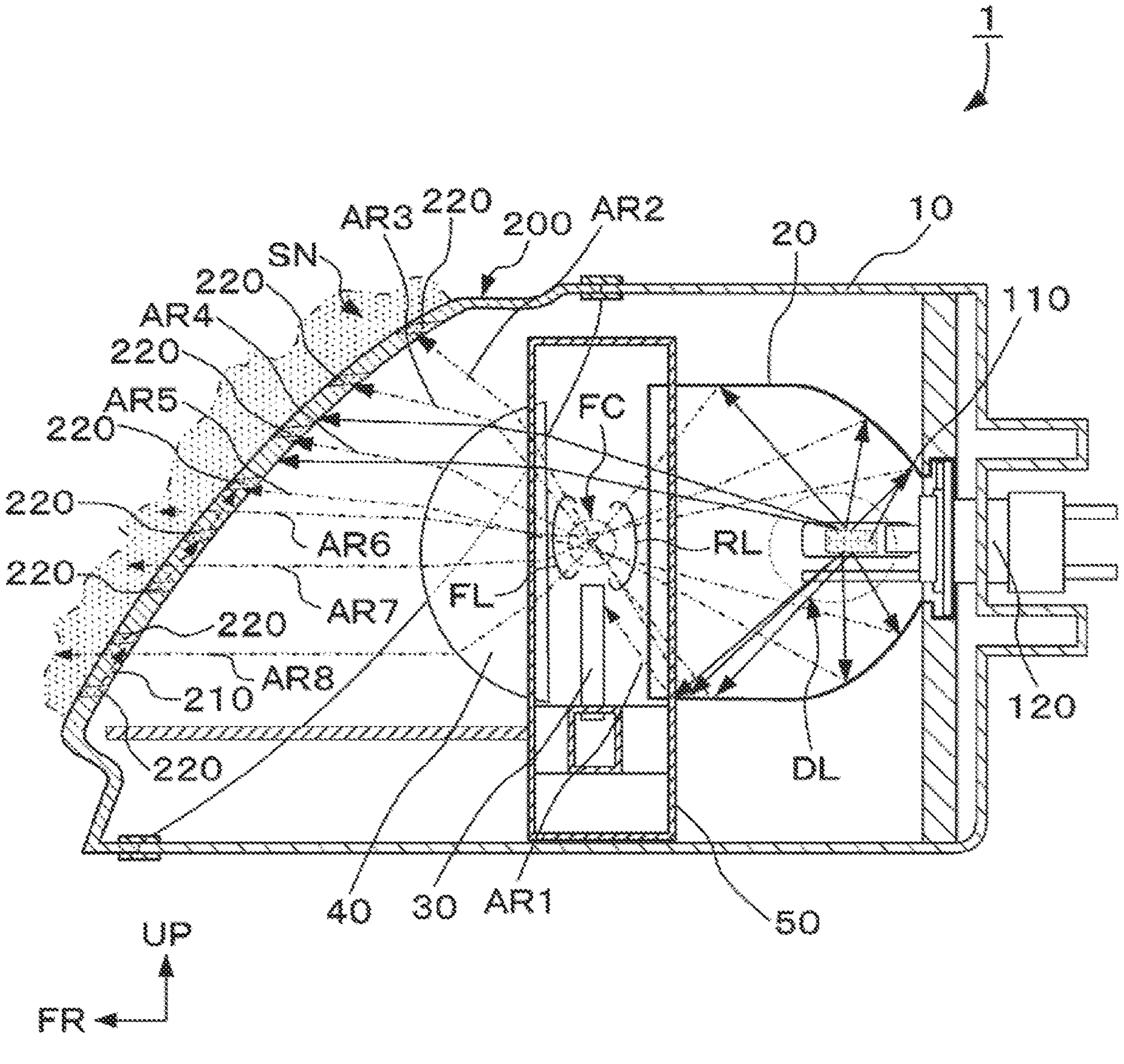
FIG. 5 illustrates the section of the illuminator illustrated in FIG. 2, with illuminating light and reflected light added thereto.
Figure 6:
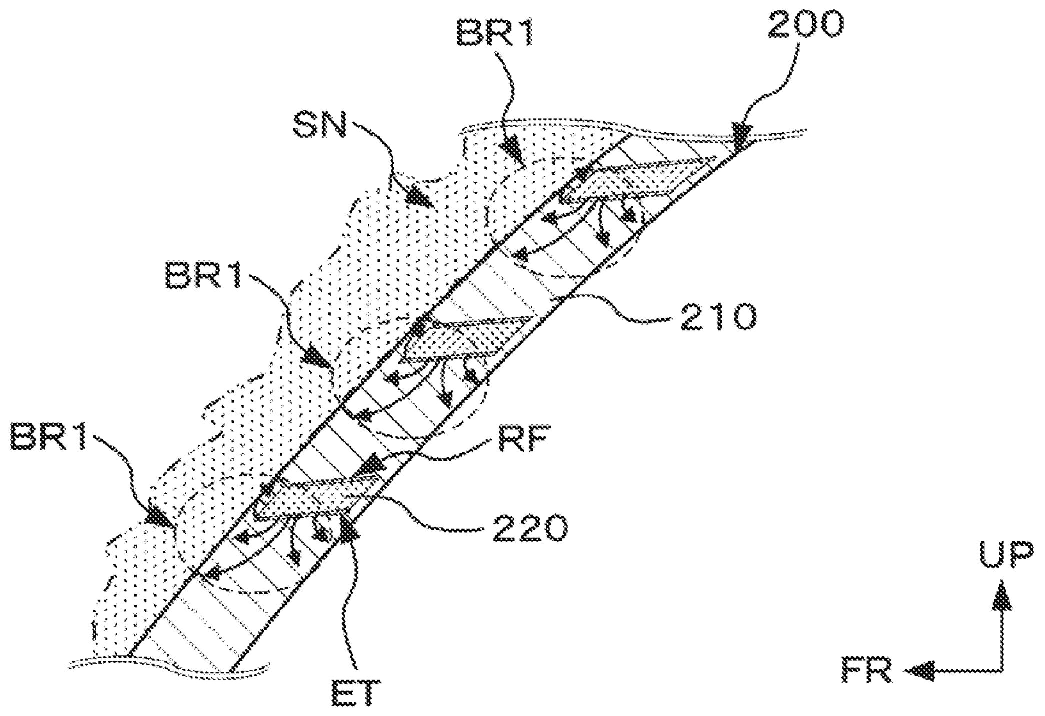
FIG. 6 illustrates how heat transfers in the part III, VI of the section illustrated in FIG. 3.

Referring now to FIGS. 5 and 6, how the illuminator 1 works will be described.

While the following describes a case where snow SW is the object to be melted, the object to be melted includes frost and ice as well.

As illustrated in FIG. 5, when the light source 110 is turned on, illuminating light DL is emitted as represented by solid-line arrows from the emission surface of the light source 110. The illuminating light DL thus emitted is reflected by the reflective member 20, which surrounds the light source 110, whereby reflected light RL represented by two-dot chain lines is generated. The illuminating light DL and the reflected light RL are regarded as front-illuminating light FL emitted from the light source 110 and traveling frontward.

The front-illuminating light FL emitted from the light source 110 and reflected by the reflective member 20 travels through the focal point FC defined above the shade 30 and reaches the projection lens 40. The shade 30 is disposed to reach such a height as to allow some beams of the front-illuminating light FL inclusive of glare to be cast onto the lower surfaces of the slats 220 but block some other beams of the front-illuminating light FL inclusive of glare that are angled upper frontward toward the area above the highest one of the slats 220. That is, as represented by an arrow AR1, one beam of the front-illuminating light FL that is reflected at a lower part of the reflective member 20 and is angled upper frontward toward the area above the highest one of the slats 220 is blocked by the shade 30. Meanwhile, as represented by arrows AR2 to AR5, for example, some other beams of the front-illuminating light FL that are angled upper frontward but are not blocked by the shade 30 are cast onto the heat-absorbing layers ET disposed at the lower surfaces of corresponding ones of the slats 220. The front-illuminating light FL thus cast onto the heat-absorbing layers ET is absorbed by the heat-absorbing layers ET and is blocked by the slats 220. Furthermore, as represented by arrows AR6 to AR8, for example, yet other beams of the front-illuminating light FL that travel horizontally frontward are transmitted through corresponding ones of the light-transmissive parts 210 and are emitted ahead of the vehicle V.

If the front surface of the outer-lens member 200 is covered with snow SN, for example, the beams of the front-illuminating light FL that are transmitted through the light-transmissive parts 210 as represented by the arrows AR6 to AR8 are reflected by the snow SN and are further reflected upward by corresponding ones of the reflective layers RF disposed at the upper surfaces of the slats 220. Then, the beams of the front-illuminating light FL that are reflected by the reflective layers RF are cast onto corresponding ones of the heat-absorbing layers ET and are absorbed by the heat-absorbing layers ET.

Since the light source 110 employs white light, the front-illuminating light FL contains infrared light. That is, the front-illuminating light FL containing infrared light is cast onto the heat-absorbing layers ET. Therefore, the heat-absorbing layers ET generate heat.

As represented by arrows BR1 in FIG. 6, the heat generated by the heat-absorbing layers ET is conducted to the resin material forming the outer-lens member 200 that is in close contact with the peripheries of the slats 220. If the heat-absorbing layers ET are formed of black anodized aluminum or black coating, the heat-absorbing layers ET exert increased efficiency in the absorption of heat from the front-illuminating light FL. Such heat-absorbing layers ET also exert increased efficiency in the absorption of radiant heat. That is, the heat-absorbing layers ET absorb the radiant heat from the heat sink disposed on the rear side of the illuminator 1 and efficiently conduct the absorbed heat to the resin material that is present around the heat-absorbing layers ET.

If the front surface of the outer-lens member 200 is covered with snow SN, the beams of the front-illuminating light FL that are transmitted through the light-transmissive parts 210 travel horizontally toward the snow SN and are reflected by the snow SN. The beams of the front-illuminating light FL that are reflected by the snow SN are further reflected by the corresponding reflective layers RF of the slats 220, are cast onto the corresponding heat-absorbing layers ET, and are converted in to heat.

Then, a part of the snow SN that is in contact with the front surface of the outer-lens member 200 is melted by the heat conducted to the outer-lens member 200, and the entirety of the snow SN drops downward under its own weight.

To summarize, the illuminator 1 according to the present embodiment includes the light-source unit 100, the reflective member 20, the shade 30, the projection lens 40, and the outer-lens member 200. The light-source unit 100 is configured to emit illuminating light DL by using an LED serving as the light source 110. The reflective member 20 is configured to generate reflected light RL by reflecting the illuminating light DL. The shade 30 is configured to block some beams of the illuminating light DL and the reflected light RL regarded as the front-illuminating light FL. The projection lens 40 is configured to cast the front-illuminating light FL toward the vehicle front side. The outer-lens member 200 includes the light-transmissive parts 210 and the slats 220. The light-transmissive parts 210 transmits the front-illuminating light FL toward the vehicle front side. The slats 220 each have a flat plate shape whose thicknesswise direction coincides with the vehicle top-bottom direction and each extend in the vehicle widthwise direction. The shade 30 is disposed to reach such a height as to block the some beams of the front-illuminating light FL that are angled toward the vehicle upper front side, and to allow some other beams of the front-illuminating light FL to be cast onto the vehicle-lower-side surfaces of corresponding ones of the slats 220. The slats 220 each have the slope TI inclining toward the vehicle lower side while extending toward the vehicle front side, the reflective layer RF disposed at the vehicle-upper-side surface thereof, and the heat-absorbing layer ET disposed at the vehicle-lower-side surface thereof.

That is, the front-illuminating light FL is cast onto the lower surfaces of the slats 220 included in the outer-lens member 200, whereby the front-illuminating light FL causes the heat-absorbing layers ET at the lower surfaces of the slats 220 to generate heat. Then, the heat generated by the heat-absorbing layers ET is conducted to the outer-lens member 200. Thus, the snow SN on the outer-lens member 200 is melted by the front-illuminating light FL and drops downward under its own weight. Furthermore, since the shade 30 is disposed to reach such a height as to allow some beams of the front-illuminating light FL that are angled upper frontward to be cast onto corresponding ones of the heat-absorbing layers ET, the illuminance of the front-illuminating light FL traveling frontward is less likely to be reduced.

If snow SN is on the front surface of the outer-lens member 200, the front-illuminating light FL transmitted through the light-transmissive parts 210 of the outer-lens member 200 is reflected by the snow SN. The front-illuminating light FL is then reflected by the reflective layers RF of the slats 220, is cast onto the heat-absorbing layers ET, and is converted into heat. Then, the heat generated by the heat-absorbing layers ET is conducted to the outer-lens member 200 and melts the snow SN on the outer-lens member 200.

Thus, the snow SN on the outer-lens member 200 is melted efficiently.

In the illuminator 1 according to the present embodiment, the outer-lens member 200 includes light-transmissive parts 210 and slats 220 that are laminated alternately in the vehicle top-bottom direction.

That is, providing slats 220 increases the number of heat-absorbing layers ET that receive the front-illuminating light FL. Therefore, the heat source contained in the front-illuminating light FL is efficiently converted into heat. Furthermore, providing light-transmissive parts 210 is less likely to reduce the illuminance of the front-illuminating light FL traveling frontward.

Thus, the snow SN on the outer-lens member 200 is melted efficiently.

In the illuminator 1 according to the present embodiment, the heat-absorbing layers ET are formed of black anodized aluminum or black coating.

In the heat-absorbing layers ET formed of black anodized aluminum or black coating, the black anodized aluminum or black coating efficiently absorb infrared light and converts the infrared light into heat. Thus, the heat-absorbing layers ET exert increased efficiency in the absorption of heat from the front-illuminating light FL. The heat-absorbing layers ET also exert increased efficiency in the absorption of radiant heat. Therefore, the heat-absorbing layers ET absorb the radiant heat from the heat sink disposed on the rear side of the illuminator 1 and efficiently conduct the absorbed heat to the resin material that is present around the heat-absorbing layers ET.

Thus, the snow SN on the outer-lens member 200 is melted efficiently.

While the embodiment of the disclosure has been described above in detail with reference to the accompanying drawings, details of the individual elements are not limited to those described in the above embodiment and may be changed within the scope of the disclosure.

The invention claimed is:

1. An illuminator for a vehicle, the illuminator comprising:

a light-source unit configured to emit illuminating light with a light-emitting diode serving as a light source;

a reflective member configured to generate reflected light by reflecting the illuminating light;

a shade configured to block a first beam of the illuminating light and a second beam of the reflected light;

a projection lens configured to cast the illuminating light and the reflected light toward a vehicle front side of the vehicle; and an outer-lens member comprising a light-transmissive part and a slat, the light-transmissive part being configured to transmit the illuminating light and the reflected light toward the vehicle front side, the slat having a flat plate shape whose thicknesswise direction coincides with a vehicle top-bottom direction of the vehicle and extending in a vehicle widthwise direction of the vehicle, wherein the shade is disposed to reach such a height as to block the first beam of the illuminating light and the second beam of the reflected light and to allow a third beam of the illuminating light other than the first beam and a fourth beam of the reflected light other than the second beam to be cast onto a vehicle-lower-side surface of the slat, the first beam and the second beam being angled toward a vehicle upper front side, and wherein the slat comprises:

a slope inclining toward a vehicle lower side while extending toward the vehicle front side;

a reflective layer disposed at a vehicle-upper-side surface of the slat; and a heat-absorbing layer disposed at the vehicle-lower-side surface of the slat.

2. The illuminator for the vehicle according to claim 1, wherein the outer-lens member comprises light-transmissive parts comprising the light-transmissive part and slats comprising the slat, the light-transmissive parts and the slats being laminated alternately in the vehicle top-bottom direction.

3. The illuminator for the vehicle according to claim 2, wherein the heat-absorbing layer is formed of black anodized aluminum or black coating.

4. The illuminator for the vehicle according to claim 1, wherein the heat-absorbing layer is formed of black anodized aluminum or black coating.

* * * * *